United States Patent
Chen et al.

(10) Patent No.: US 7,382,728 B2
(45) Date of Patent: Jun. 3, 2008

(54) NETWORKING SWITCHING APPARATUS AND METHOD FOR CONGESTION CONTROL

(75) Inventors: Jen-Kai Chen, Taipei (TW); Hsiang-Yi Huang, Taipei (TW)

(73) Assignee: Via Technologies, Inc., Taipei (TW)

( * ) Notice: Subject to any disclaimer, the term of this patent is extended or adjusted under 35 U.S.C. 154(b) by 918 days.

(21) Appl. No.: 10/157,238

(22) Filed: May 30, 2002

(65) Prior Publication Data

US 2002/0181396 A1    Dec. 5, 2002

(30) Foreign Application Priority Data

May 31, 2001    (TW) ............................... 90113274 A (51) Int. Cl.
*H04L 12/56* (2006.01)
(52) U.S. Cl. ..................................... 370/235
(58) Field of Classification Search ...................... None
See application file for complete search history.

(56) References Cited

U.S. PATENT DOCUMENTS

| | | | |
|---|---|---|---|
| 5,838,677 A * | 11/1998 | Kozaki et al. .............. | 370/389 |
| 6,018,515 A * | 1/2000 | Sorber ........................ | 370/229 |
| 6,163,528 A * | 12/2000 | Nagamoto .................. | 370/236 |
| 6,219,728 B1 * | 4/2001 | Yin ............................ | 370/236 |
| 6,229,789 B1 * | 5/2001 | Simpson et al. ............ | 370/235 |
| 6,657,962 B1 * | 12/2003 | Barri et al. ................. | 370/235 |
| 6,661,802 B1 * | 12/2003 | Homberg et al. ........... | 370/412 |
| 6,687,254 B1 * | 2/2004 | Ho et al. .................... | 370/231 |
| 6,721,273 B1 * | 4/2004 | Lyon .......................... | 370/235 |
| 6,813,243 B1 * | 11/2004 | Epps et al. ................. | 370/235 |
| 6,859,435 B1 * | 2/2005 | Lee et al. ................... | 370/231 |
| 6,940,814 B1 * | 9/2005 | Hoffman ..................... | 370/235 |
| 7,002,980 B1 * | 2/2006 | Brewer et al. .............. | 370/235 |
| 2004/0076161 A1 * | 4/2004 | Lavian et al. ........... | 370/395.41 |
| 2005/0073957 A1 * | 4/2005 | Lay ............................ | 370/235 |

* cited by examiner

*Primary Examiner*—Anh-Vu Ly
(74) *Attorney, Agent, or Firm*—Rabin & Berdo, P.C.

(57) ABSTRACT

A network switching apparatus and method for congestion control. Each one of the connection ports of the switching apparatus includes a low priority queue and a high priority queue. When a data packet enters a switching apparatus, the switching apparatus according to the type of the data packet enqueues the data packet to the low priority queue or the high priority queue. When congestion occurs at the switching apparatus, the low priority queue and the high priority queue can respectively perform the different ways of the congestion control, according to the input congestion mode. Also, when the switching apparatus receives a pause frame, response flow control can be performed, according to the output congestion mode. Since the different ways of the congestion control are performed according to the different types of the data packet, the congestion control can be optimized.

16 Claims, 6 Drawing Sheets

NETWORKING SWITCHING APPARATUS AND METHOD FOR CONGESTION CONTROL

This application incorporates by reference Taiwanese application Serial No. 090113274, Filed May 31, 2001.

BACKGROUND OF THE INVENTION

1. Field of the Invention

This invention relates to a network switching apparatus and method, and more particularly to a network switching apparatus and method being provided for congestion control.

2. Description of Related Art

A network switch can allow a number of workstations or local area network (LAN), which have been connected to the switch, to simultaneously transceive data information, so as to enhance the performance of the whole network. In order to achieve the switching purpose, the switching apparatus should record the connection operation that which one of the workstation or LAN is connected to which one of the connection port. This is in other words like the address learning function of a bridge. When the switching apparatus receives a data packet, it first goes to the forwarding table to look up the target port in response to the data packet. If it can be found from the table, then the data packet is exported to the target port, which connects the target of workstation or LAN. If it is not found from the table, then this data packet is broadcasted to all of the connection ports, so as to ensure that the target of workstation or LAN can receive the data packet.

Figure 1:
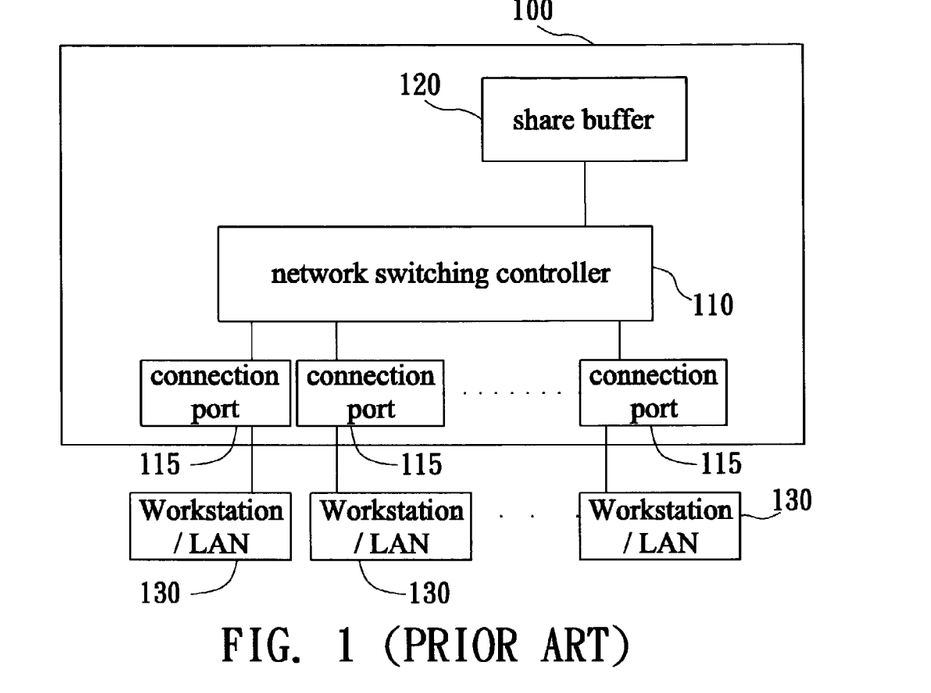
FIG. 1 is drawing of block diagram, schematically illustrating a conventional network switching apparatus.

Referring to FIG. 1, it schematically illustrates a conventional network switching apparatus. A network switching apparatus 100 is connected with a number of work-stations or LANs 130. The network switching apparatus 100 includes a network switching controller 110, a share buffer 120, and a plurality of connection ports 115. The connection ports 115 are connected with the workstations or LANs 130. The switching apparatus 100 receives a data packet from these workstations or LANs 130 through the connection ports 115. The data packet is then forwarded to the workstation or LAN 130 as intended by the data packet. The network switching controller 110 is connected to the share buffer 120. The network switching controller 110 that temporarily stores the data packet into the share buffer 120. After the target connection port, which is intended by the data packet, is determined for output. And then, the packet is transmitted to the target workstation or LAN 130 through the target connection port.

According to the standard of the IEEE 802.3u protocol, the auto-negotiation function is incorporated therein to allow the network switching apparatus and Ethernet adapters of the workstation or LAN can perform the auto-negotiation between each other, so as to obtain the status of each other, such as the information about the transceiving speed for the Ethernet adapter, or types of full duplex or half duplex, and so on. Also and the transmission mode between each other is negotiated to have the best mode. Full duplex is superior to half duplex. The faster speed of 100M is superior to the slower speed of 10M. After the best one of transmission mode is negotiated, in order to increase the throughput, the switching apparatus can further provide congestion control, so as to allow the data packets in the switching apparatus to be transmitted. In the share buffer 120, those portions of memory not being used yet are called the free buffers. When the number of the free buffers is zero, the congestion must occur. Due to this reason, the congestion control should be performed before the congestion occurs, so as to prevent the congestion from occurring.

Figure 2:
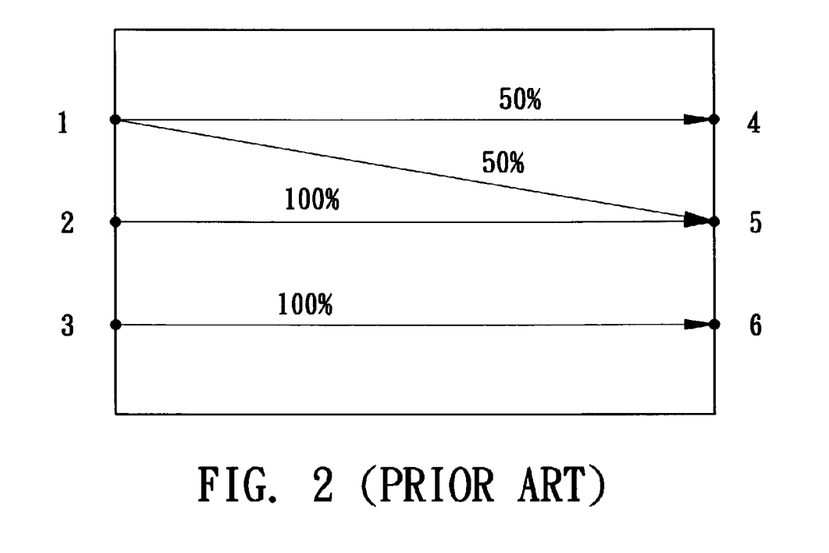
FIG. 2 is a drawing schematically illustrating an example of the congestion occurring on the Ethernet switching controller.

Referring to FIG. 2, it schematically illustrates an example of the congestion occurring on the Ethernet switching controller 110. Assume all of the connection ports having the same transmitting speed of 100 Mbps, the connection ports 1,2, and 3 are serving as the source ports, and the connection ports 4, 5, and 6 are serving as the target ports. For the situation, the connection port 2 is transmitting data packets to the connection port 5 with 100% bandwidth, and at the same time the connection port 1 is transmitting data packets to the connection ports 4 and 5 with 50% bandwidth respectively, and the connection port 3 is transmitting data packets to the connection port 6 with 100% bandwidth. In this situation, the transmitting speed for transmitting to the connection port 5 is then 150 Mbps, which speed has been over maximum diverting ability of the connection port 5. Therefore, the data packets will be gathered at the connection port 5. This would cause that the free buffers in the share buffer 120 will be used up. If the free buffers in the share buffer 120 are used up, then it will cause the other connection ports cannot properly work in the normal condition, and a congestion situation will occur. Conventionally, the network switching apparatus, according to the connected Ethernet adapter of the workstation or LAN, usually provides three types of congestion controls. (1) When the connected one is a half duplex device, backpressure control is adopted, that is, the switching apparatus issues a collision signal, to damage the data packet. When the source workstation or LAN has detected the collision signal, the data packet will be transmitted again after waiting for a certain period of time. (2) When the connected device has the function of full duplex but has no ability to perform the flow control, drop control is adopted. A full duplex device implies that the transmitting action and receiving action can be performed at the same time through the different transmission lines, such that the collision signal cannot be used. In this situation, the switching apparatus therefore drops the data packet at the destination port without occupying any free buffer. (3) When the connected device has the function of full duplex and has the ability to perform the flow control, flow control is adopted. The switching apparatus can issue a pause signal to the source workstation or LAN for flow control so that the source port will not send any packet to the destination port for a period, and then the purpose to alleviate the situation of congestion occurring on the connection port can be achieved.

The U.S. Pat. No. 4,942,569 has introduced a method for sequentially exporting the data packets according to the priority of them. However, the conventional method of congestion control is still not enough to solve the large amount of network flow, which increases day by day. In fact, it has been the object strongly desired by the manufacturers to find a method of congestion control to have better efficiency.

SUMMARY OF THE INVENTION

It is therefore an objective of the present invention to provide a network switching apparatus and method suitable for use on congestion control.

According to the objective of the present invention, the present invention provides a network switching apparatus suitable for use on congestion control, which is used in a switching apparatus. The switching apparatus includes a number of connection ports and share buffers. The switching apparatus can be connected with a number of workstations or LANs through the connection ports, so that the workstations or LANs can transmit the data packets to each other at the same time. The switching apparatus includes a buffer control device, a plurality of connection port control devices, a forwarding device, and a queue control device. The buffer control device is connected to the share buffer. The buffer control device takes segment as a unit and requests the share buffer to have allocation and to release the memory. The plurality of the connection port control devices are connected to these workstations or LANs and the buffer control device. These connection port control devices are respectively corresponding to the connection port one by one. When the one of the connection port control devices corresponding to one source connection port receives a data packet, the one of the connection port control devices, according to the size of the data packet, will request to the buffer control device to allocate segments needed by the data packet, and then the data packet is stored into the allocated segments. The forwarding device is connected to each one the connection port control device, and is used to determine which one of the connection ports, according to the type of the data packet, is the intended one for the data packet to be transferred. The queue control device is connected to the buffer control device and the forwarding device. The queue control device includes a number of high priority queues and a number of low priority queues. One of the high priority queues and one of the low priority queues are commonly corresponding to the same one of the connection port control device, in which each one of the queues is respectively defined by a reserved number of segments. The queue control device, according to the type of the queue, connects the segments used for storing the data packet to the connection port corresponding to the target at one of the high priority queue and the low priority queue. The queue control device can also detect whether or not the connection port is at the condition of congestion.

According to another objective of the present invention, the present invention provides method for congestion control, which is applied in a switching apparatus. The switching apparatus and a number of workstations or LANs are connected together, so as to allow the workstations or LANs to be able to transmitting the data packets to each other. The switching apparatus includes a number of connection ports and a share buffer. These connection ports are connected to the workstations or LANs. Each one of the connection ports individually has a low priority queue and a high priority queue. Each one of the queues separately has been defined to have the parameters of a reserved number of segments R and the maximum reserved number of segments R max, in which the queues are used to temporarily store the data packets, which are to be exported. The number of segments to store all of the data packets in one of the queues is S. When the quantity S is less than or equal to the maximum reserved number of segments R max, then the reserved number of segments R is R max−S. When the quantity S is greater the maximum reserved number of segments R max, then the reserved number of segments R is 0. When the switching apparatus receives one data packet through one of the connection ports, the switching apparatus then judges out which one of the connection is the target intended by the data packet, and makes a request to the share buffer to allocate the memory needed for storing the data packet, and then stores it. The share buffering region takes the segment as a unit to allocate the memory. This control method for solving the network congestion includes that: in the step (a) it is to detect whether or not the target connection port is in congestion. If it is, then the step b is performed. In the step (b), according to the type of the data packet, the data packet is sent to one of the high priority queue and the low priority queue of the target connection port. And then the step c is performed. In the step (c), it is checked whether or not the workstation or LAN connected to the target connection port is half duplex. If it is, the option of backpressure control is taken and the procedure goes to the end. If it is not, then step d is performed. In the step (d), it is checked whether or not the workstation or LAN has the ability of flow control. If it is, then the procedure enters the step e. If it is not, then the option of drop control is taken, and the procedure goes to the end. Then, in the step (e), according to the input congestion mode of the queue for the data packet, one option of the flow control and the drop control is taken.

According to another yet objective of the present invention, the present invention provides method for congestion control, which is applied in a switching apparatus. The method comprises: if the data packet is coming from an output of a high priority queue from a source connection port, then the congestion control is performed according to the output congestion mode with the high priority queue of the source connection port. If the data packet is coming from an output of a low priority queue from a source connection port, then the congestion control is performed according to the output congestion mode with the low priority queue of the source connection port.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 3:
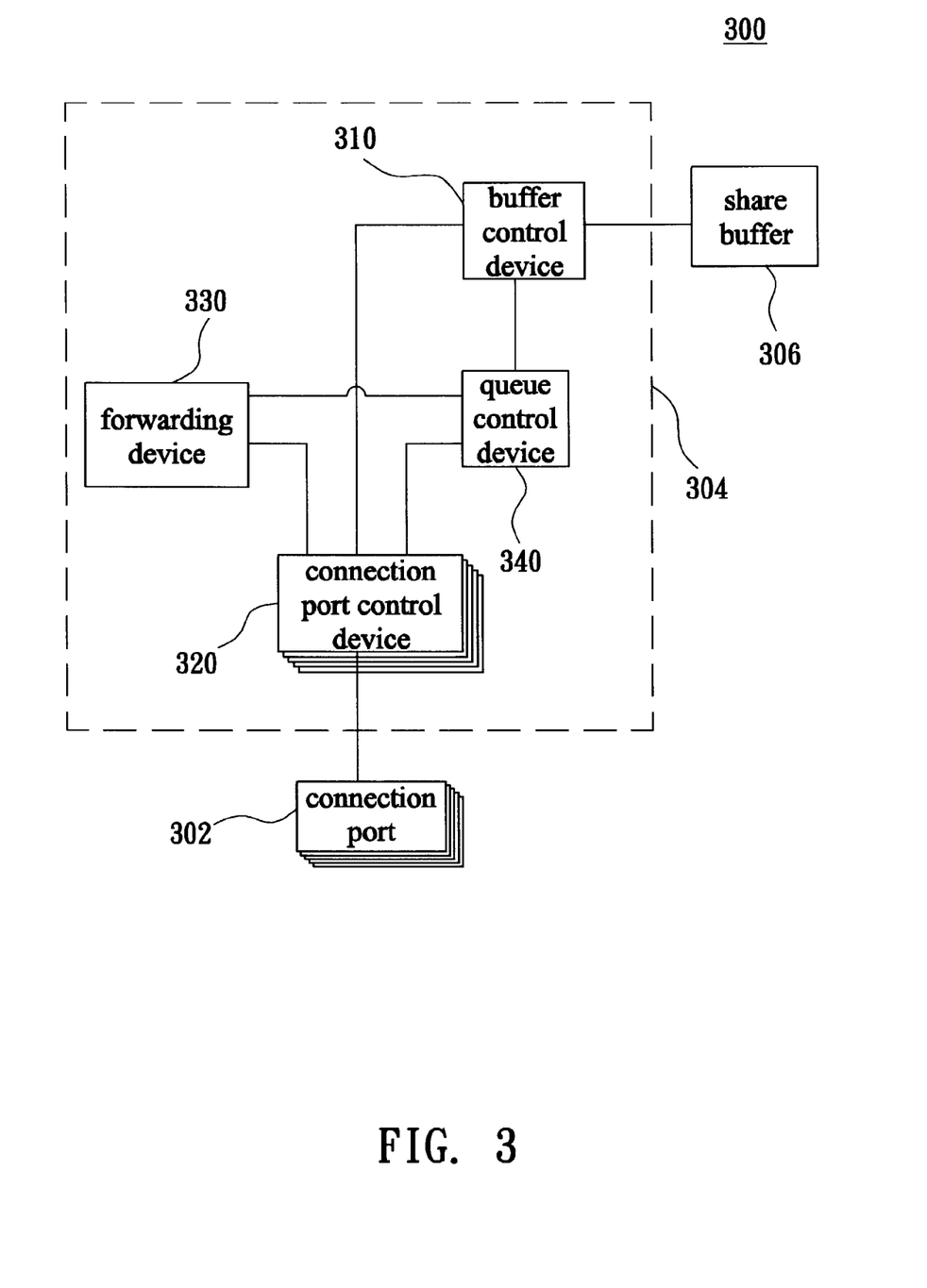
FIG. 3 is a drawing of block diagram, schematically illustrating a switching apparatus, according to a preferred embodiment of the present invention.

Referring to FIG. 3, it is a drawing of block diagram, schematically illustrating a switching apparatus, according to a preferred embodiment of the present invention. The network switching apparatus 300 includes a plurality of connection ports 302, a network switching controller 304, and a share buffer 306. The switching apparatus can be connected to a number of workstations or LANs 130 through the connection ports 302, so that the workstations or LANs 130 can transmit the data packets to each other at the same time. The network switching controller 304 includes a buffer control device 310, a plurality of connection port control devices 320, a forwarding device 330, and a queue control device 340. The buffer control device 310 is connected to the share buffer 306, and the buffer control device 310 uses "segment" as a fundamental unit to make a request to the share buffer 306 for allocating the memory or free (releasing) the memory. The size of a data packet is preferably greater than one segment. According to the size of the data packet, at least one segment is allocated, such that the using efficiency of the network switching apparatus can be increased. The plurality of the connection port control devices 320 are connected to the buffer control device 310, and these connection port control devices 320 are one by one connected to the connection ports 302 respectively. When the ith connection port control devices 320(i) corresponding to one source connection port 302(i) receives a data packet, the one of the connection port control devices 320(i), according to the size of the data packet, will make a request to the buffer control device for allocating one or more segments needed by the data packet, and then the data packet is stored into the allocated segments. The forwarding device 330 is connected to each one of the connection port control devices, and is used to determine the destination port 302(k), according to the header of the data packet. The queue control device 340 is connected to the buffer control device 310 and the forwarding device 330. The queue control device 340 includes a plurality of high priority queues Qh and a plurality of low priority queues Ql. Each high priority queue Qh(k) is connected to the corresponding connection port control device 320(k), and each low priority queue Ql(k) is also connected to the corresponding connection port control device 320(k). The high priority queue Qh(k) is defined to have a reserved number of segments Rh(k) and a maximum reserved number of segments Rhmax (k). The low priority queue Ql(k) is defined to have a reserved number of segments Rl(k) and a maximum reserved number of segments Rlmax (k). The queue control device 340, by determining the priority type of the data packet, associates the segments used for storing the data packet with the high priority queue Qh(k) or the low priority queue Ql(k) of the target port 302(k). The queue control device 340 can also determine whether or not the connection port 302(k) is at the condition of congestion. Assume the maximum reserved number of segments Rh max (or Rl max (k)) of each one of the queues is 50. When one queue has enqueued data of 3 segments, then the reserved number of segments for Rh (k) (or Rl (k)) of this queue will only have the leftover of 50−3=47. If the queue has the data, which is larger than the maximum reserved number of segments Rh max (or Rl max (k)), then the reserved number of segments for Rh (k) (or Rl (k)) of this queue is 0.

Figure 4:
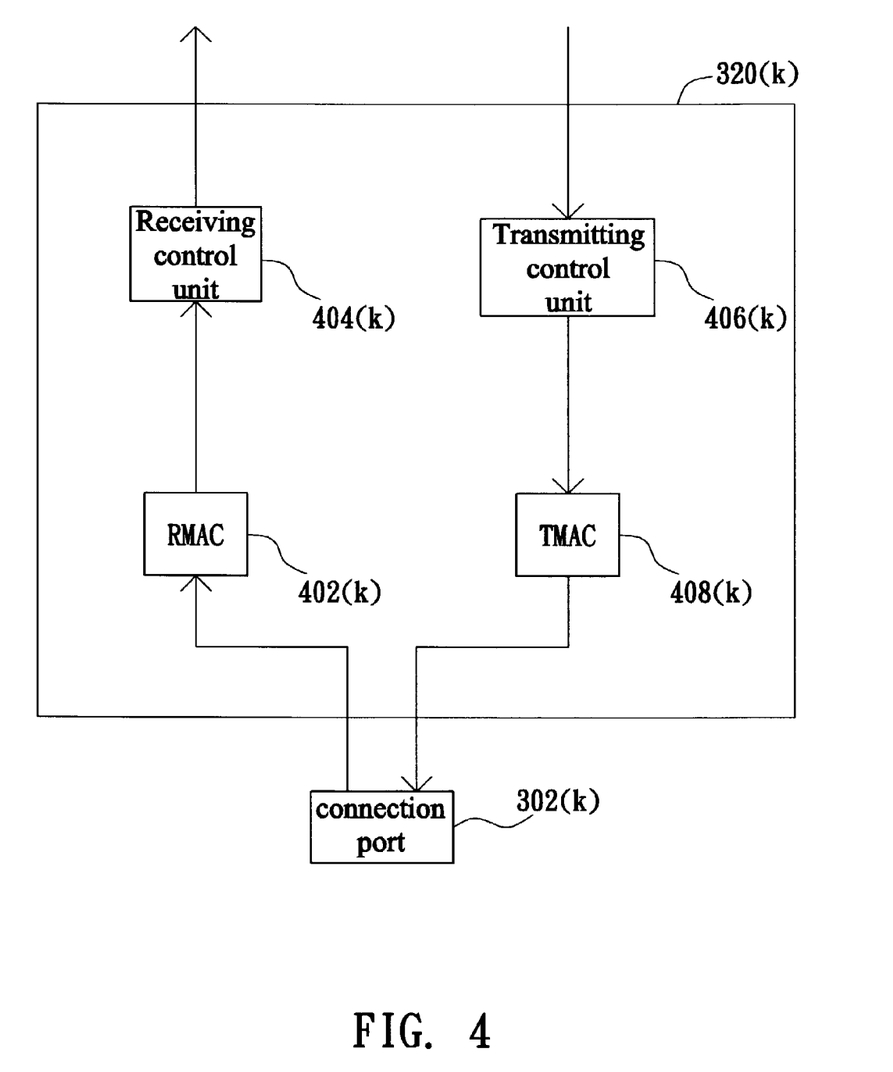
FIG. 4 is a drawing of block diagram, schematically illustrating the connection port control device in FIG. 3.

FIG. 4 is a drawing of block diagram, schematically illustrating one connection port control device 320(k) in FIG. 3. The connection port control device 320(k) includes a receiving media access control (RMAC) unit 402(k), a receiving control unit 404(k), a transmitting control unit 406(k), and a transmitting media access control (TMAC) unit 408(k). The receiving media access control unit 402(k) is connected to the connection port 302(k), used to receive the data packet. The receiving control unit 404(k) is connected to the receiving medis access control unit 402(k), the queue control device 340, and the buffer control device 310. When the RMAC 402(k) receives the data packet, the receiving control unit 404(k) then makes a request to the buffer control device 310 to allocate one or more segments needed by the data packet, so as to temporarily store the data packet. Also, the queue control device 340 is informed to associate these segments with the corresponding queue, which is one of the high priority queue Qh (k) or the low priority queue Ql (k). The transmitting control unit 406(k) is connected to the queue control device 340 and the buffer control device 310, and is used to export the data packet through the high priority queue Qh (k) or the low priority queue Ql (k). The transmitting control unit 406(k) will request the buffer control device to release the segments occupied by the data packet after the transmission is completed. The transmitting media access control unit 408(k) is connected to the transmitting control unit 406(k) and the connection port 302(k), and is used to export the data packet to the corresponding one of the connection ports.

The queue control device 340 determines whether or not the connection port 302(k) is under the condition of congestion as described in the following. First, a parameter C is defined as the minimum threshold value for the congestion, which also uses the segment as the unit, and is used to prevent the buffer starvation during the worst situation. A parameter D is defined as the total reserved number of the segments. A parameter E is defined as the threshold value at the minimum to quit the congestion. A parameter Ψ is defined as the summation of the reserved number of the segments for each one of the queues, that is, $$\Psi = \sum_k [Rh(k) + Rl(k)].$$

A parameter Φ is defined as the total number of the segments in the share buffer but have not been used yet. It can be judged by three judging conditions for whether or not the congestion situation has occurred. When one of the three conditions is matched, it means that the congestion occurs. The first condition is $\Phi \leq C$. This condition means that the total number of the segments not being used Φ is less than the minimum threshold value C for the congestion. At this time, it is judged that the situation of congestion occurs. The second condition is as follows. Assume that a data packet is enqueued to the high priority queue Qh (k) of the target connection port 302(k). If the reserved number of the segments Rh (k) becomes zero and Φ is less than or equal to a maximum between the total reserved number of the segments D and the summation of the reserved number of the segments for each one of the queues Ψ, then it is judged that the situation of congestion occurs at the connection port 302(k). The third condition is as follows. Assume that a data packet is enqueued to the high priority queue Qh (k) of the target connection port 302(k). If the reserved number of the segments Rh (k) becomes zero and the situation of congestion at any one of the other connection ports 302 has already occurred, then it is judged that the situation of congestion has occurred at the connection port 302(k).

Figure 5:
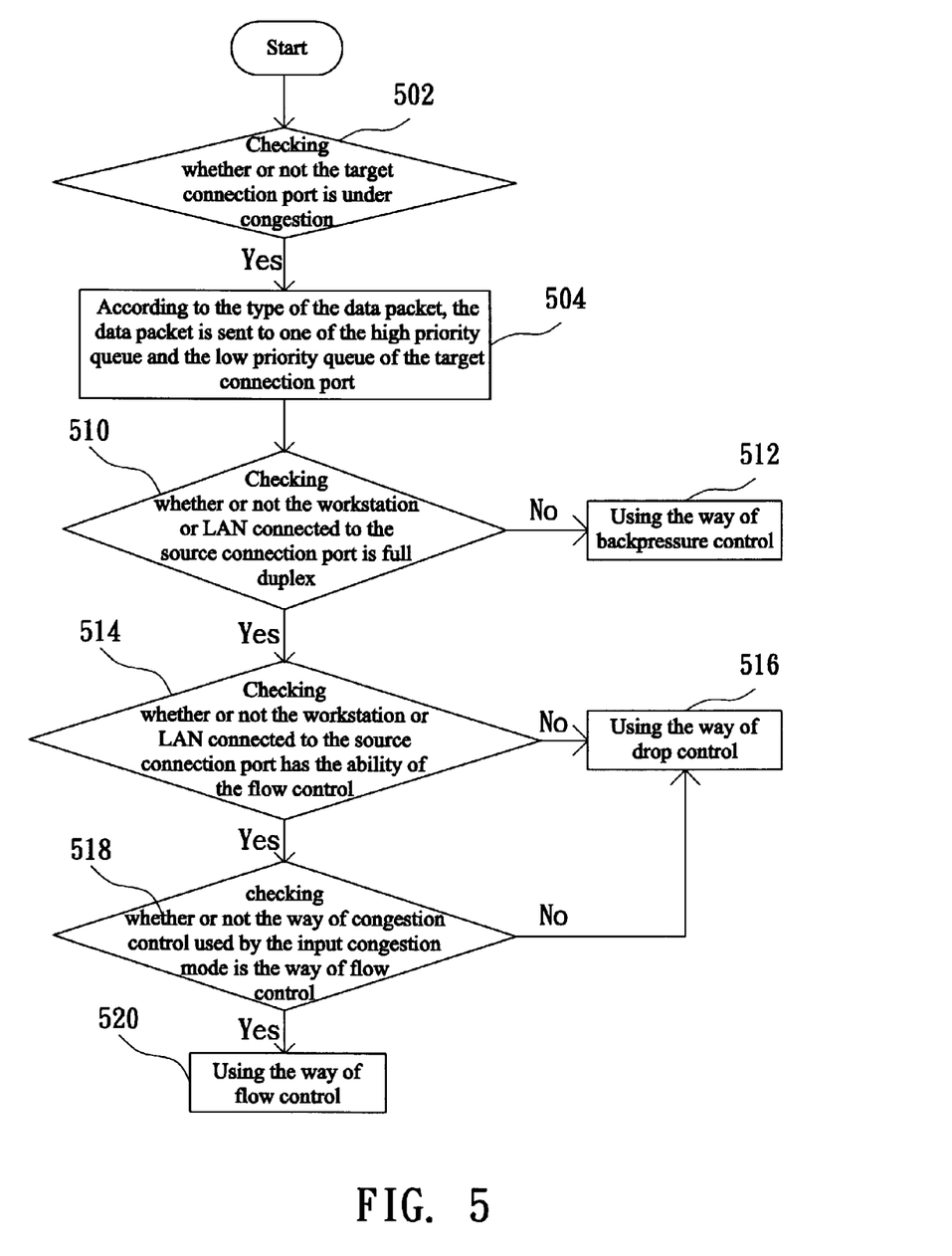
FIG. 5 is a flow diagram of the congestion control.

Referring to FIG. 5, it is a flow diagram, of the congestion control. When the network switching apparatus 100 receives a data packet through the connection port 302(i), the connection port 302(i) is thus the source connection port. The forwarding device 330 then determines the target port 302(k) according to the packet header. First, as shown in the step 502, it is judged whether or not the target connection port is under congestion. If it is, then step 504 is performed. According to the type of the data packet about the high priority or the low priority, the data packet is sent to one of the high priority queue Qh (k) and the low priority queue Ql (k) of the target connection port 302(k). And then, it is checked whether or not the workstation or LAN connected to the source connection port 302(i) is full duplex as shown in step 510. If it is, then step 514 is performed. If it is not, then step 512 is performed. In step 512, the principle of backpressure control is adopted for the congestion control. That is, a collision signal is issued by the source connection port 302(*i*) to break the data packet, so that the data packet is temporarily not to be sent to the network switching apparatus 300. Then the procedure goes to the end. In step 514, it is checked whether or not the workstation or LAN connected to the source connection port 302(*i*) has the ability of the flow control. If it is, then step 518 is performed. If it is not, then step 516 is performed. In step 516, the principle of drop control is adopted for the congestion control. That is, the forwarding device 330 is informed to drop the data packet, which is to be sent to the target connection port 302(*k*). And then, the procedure goes to the end. In step 518, it is checked whether or not the congestion control used by the input congestion mode set to the high priority queue Qh (k) or the low priority queue Ql (k), in which the data packet stays, is the flow control, as shown in step 518. If it is, then step 520 is performed. If it is not, then step 516 is performed. In Step 520, the flow control is used. That is, a pause frame is issued to the workstation or LAN 130, which is connected to the source connection port 302(*i*). And then, the procedure goes to the end. If the workstation or LAN 130 which is connected to the source connection port 302(*i*), has the function of the flow control, then after the workstation or LAN 130 receives the pause frame, it can perform the procedure of a response flow control, as will be described in the following.

The data of the data packet can be usual data or the audio and video data. The usual data needs precise data transmission, but the audio and video data need to be instantly transmitted, It is therefore that the drop control is more suitable in use for the audio and video data when the situation of congestion has occurred. However, for the usual data, it is more suitable to adopt the flow control. For example, when the network switching apparatus 300 receives a data packet, the data packet with the audio and video data can be transmitted to the high priority queue, and the data packet with usual data can be transmitted to the low priority queue. Also, the high priority queue is set to perform drop control, and the low priority queue is set to perform flow control. The network switching apparatus 300 can determine whether the data packet is belonging to the audio and video data or the usual data according to the format of the data packet.

Figure 6:
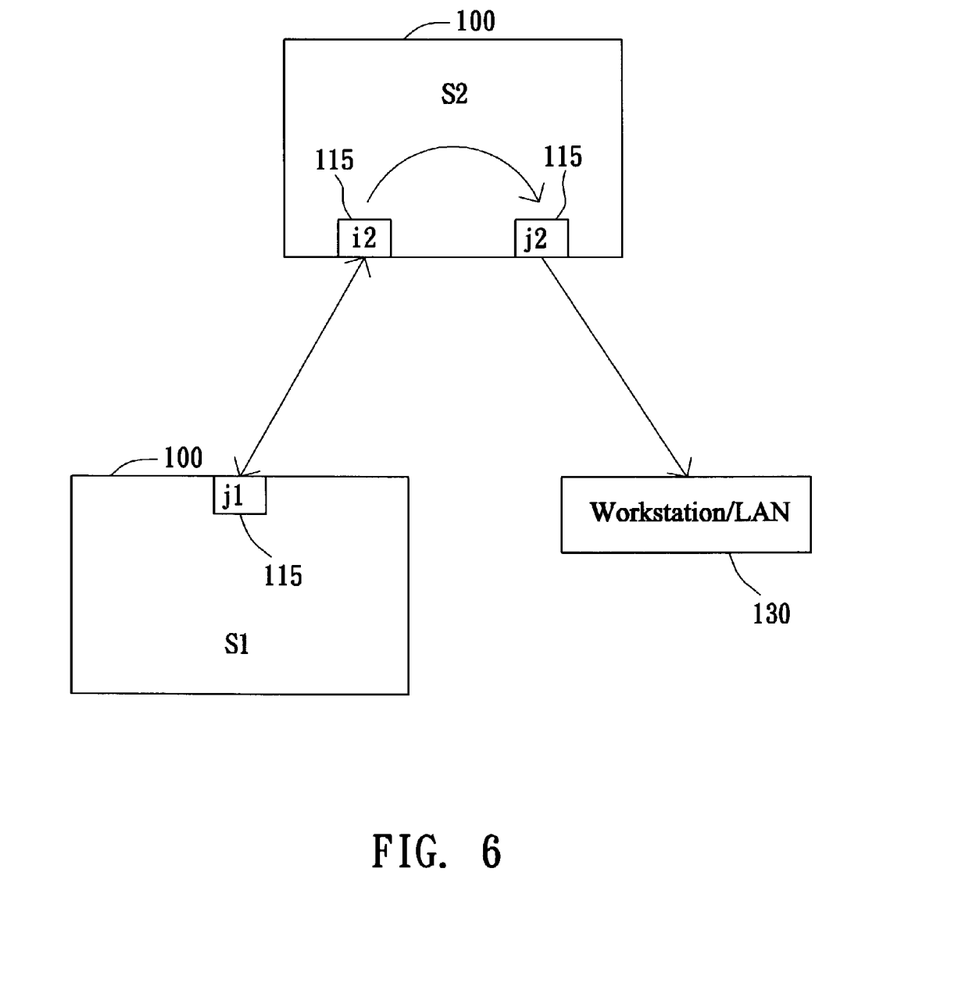
FIG. 6 is a drawing, schematically illustrating the relation between the switching apparatus S1 and S2, according to a preferred embodiment of the present invention.
Figure 7:
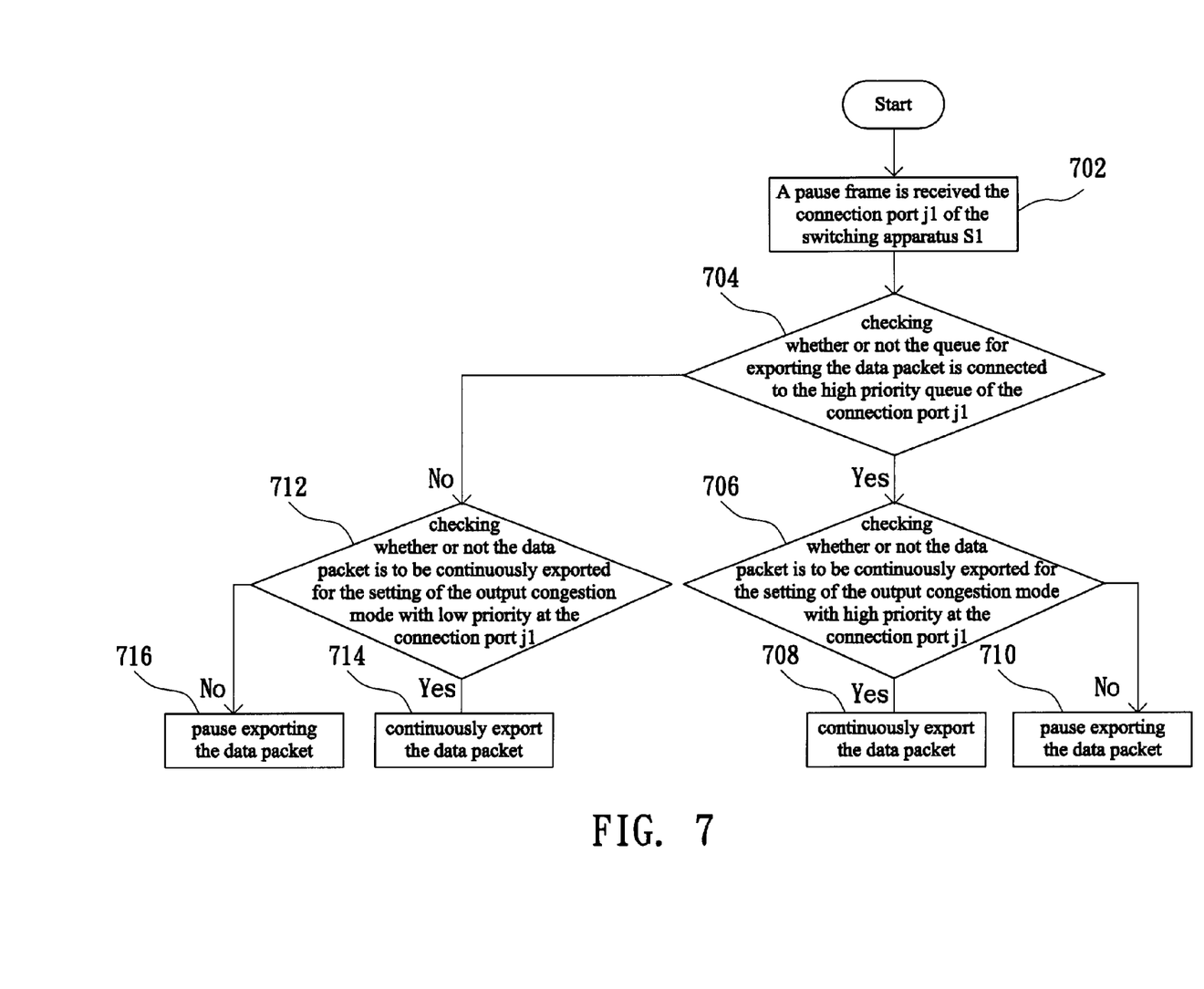
FIG. 7 is a flow diagram, schematically illustrating the control procedure on the switching apparatus S1, according to a preferred embodiment of the present invention.

The switching apparatus introduced by the present invention also provides a method of response control, which can be applied between a switching apparatus S1 and a switching apparatus S2. Referring to FIG. 6, it is a drawing, schematically illustrating the relation between the switching apparatus S1 and the switching apparatus S2. Both the switching apparatus S1 and S2 are full duplex and have the ability of flow control. The connection port j1 of the switching apparatus S1 is connected to the connection port i2 of the switching apparatus S2. When the switching apparatus S1 transmits a data packet to the switching apparatus S2 through the high priority queue /the low priority queue of the connection port j1, the switching apparatus S2 will determine whether the data packet is in high priority or low priority, according to the type of the data packet. Then, the switching apparatus S2, according to the type of the data packet, transmits the data packet to the connection port j2 if the switching apparatus S2. Referring to FIG. 7, it is a flow diagram, schematically illustrating the control procedure on the switching apparatus S1. When a situation of congestion occurs at the connection port j2 of the switching apparatus S2, if the switching apparatus S2 performs the flow control, as described in the previous step of 520, then a pause frame is issued to the connection port j1 of the switching apparatus S1. When the switching apparatus S1 receives the pause frame, as shown in step 702, a method of response flow control is then performed. First it is checked whether or not the queue for exporting the data packet is a high priority queue of the connection j1 as shown in step 704. If it is, then step 706 is performed. If it is not, then step 712 is performed. In step 706, it is checked whether or not the data packet is to be continuously exported in response to the setting of the output congestion mode of high priority at the connection port j1 as shown in step 706. If it is, then the data packet is continuously exported as shown in step 708. If it is not, the exportation of data packet temporarily pauses as shown in step 710. In step 712, it is not, checked whether or not the data packet is to be continuously exported in response to the setting of the output congestion mode of low priority at the connection port j1 as shown in step 712. If it is, then the data packet is continuously exported as shown in step 714 If it is not, the exportation of data packet temporarily pauses as shown in step 716. When the switching apparatus S1 chooses to continuously export the data packet to the connection port j2 of the switching apparatus S2, where the situation of congestion occurs the switching apparatus S2 then is switched to the drop control, so as to prevent too many data packets from being enqueued at the connection port j2. That is because the audio and video data concerns real-time transmission at first. In this manner, when the switching apparatus S1 is under flow control, it can selectively export the data packet, so that it ensures that the audio and video data can be transmitted without delay.

The present invention described above in the preferred embodiment has disclosed a network switching apparatus, which is suitable for use on the congestion control, has a number of advantaged as follows:

1. The share buffer in the prior art assigns a fixed size of memory to every data packet but cannot dynamically assign the different size of the memory to the data packet according to the different size of the data packer. This causes that the utilization efficiency of the share buffer is not high. The share buffer of the present invention takes the segment as the unit for assigning the size of the memory. As a result, the share buffer can have higher utilization efficiency.

2. Since the target connection port can correspond to the high priority queue and the low priority queue, the target connection port can determine the sequence for exporting the data packets by their priorities. This can effectively increase the transmission efficiency of the data packet in the network switching apparatus.

3. The user can set the input congestion mode. That is, when the situation of congestion occurs on the high priority queue and the low priority queue, a method of the individual congestion control can be respectively set. As a result, the management can be optimized according to actual use status on the network.

4. The user can set the output congestion mode. That is, the switching apparatus takes a proper response manner when it is under control of flow, so that the switch apparatus can be more flexibly set according to the difference of the transmitted data packet.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A network switching apparatus with congestion control, the network switching apparatus comprising:
   a share buffer;
   a plurality of connection ports;
   a buffer control device, coupled to the share buffer;
   a plurality of connection port control devices, coupled to the buffer control device, wherein the connection port control devices correspond to the connection ports one by one, when a connection port control device of the connection port control devices receives a data packet from a source of a connection port, said connection port control device makes a request to the buffer control device, according to a size of the data packet, for allocating at least one segment needed by the data packet, and thereby the data packet is stored in the at least one segment;
   a forwarding device, coupled to the connection port control devices, and determining a target connection port, for the data packet, according to a type of service of the data packet; and
   a queue control device, which is coupled to the buffer control device and the forwarding device, wherein the queue control device comprises a plurality of high priority queues and a plurality of low priority queues, one of the high priority queues and one of the low priority queues corresponding to one of the connection port control devices, and wherein the queue control device associates said at least one segment, to one of the priority queues, according to the type of service of the data packet;
   wherein each one of the connection port control devices respectively includes:
      a receiving media access control (RMAC) unit, coupled to one workstation or one Local Area Network (LAN), so as to receive the data packet,
      a receiving control unit, coupled to the receiving media access control unit, the queue control device, and the buffer control device, wherein when the receiving media access control unit receives the data packet, the receiving control unit then makes a request to the buffer control device to allocate said at least one segment, so as to store the data packet, and also makes a request to the queue control device to associate said at least one segment with an associated one of the queues;
      a transmitting control unit, coupled to the queue control device and the buffer control device, so as to export the data packet from the associated one of the queues, and cause the buffer control device to free the at least one segment, originally occupied by the data packet, and
      a transmitting media access control (TMAC) unit, coupled to the transmitting control unit and said workstation or LAN, so as to export the data packet to a corresponding one of the connection ports.

2. The network switching apparatus in accordance with claim 1, wherein the buffer control device takes said segment as a unit, and makes a request to the share buffer to allocate memory and free allocated memory.

3. The network switching apparatus in accordance with claim 1, wherein each one of the queues reserves a number of segments.

4. The network switching apparatus in accordance with claim 1, wherein the queue control device is further used for determining whether the target connection port is in a condition of congestion so as to enqueue the data packet, according to the type of service of the data packet, to one of the high priority queue and the low priority queue which correspond to the target connection port if the target connection port is in a condition of congestion.

5. The network switching apparatus in accordance with claim 4, wherein a parameter C is defined as a minimum threshold for congestion, which uses segments as units, and is used to prevent buffer starvation; a parameter $\phi$ is defined as a total number of the segments in the share buffer but having not been used,
   wherein the queue control device determines that the target connection port is in a situation of congestion when the total number of the segments not being used $\phi$ is less than the minimum threshold for congestion C.

6. The network switching apparatus in accordance with claim 4, wherein a parameter $\Psi$ is defined as the summation of the reserved number of the segments R for each one of the queues, a parameter $\phi$ is defined as a total number of the segments in the share buffer but having not been used,
   the queue control device determines that the target connection port is in a situation of congestion when the reserved number of the segments R of one of the queues for the target connection port to store the data packet is zero, and a situation of congestion has occurred on any one of the other connection ports.

7. The network switching apparatus in accordance with claim 4, wherein a parameter D is defined as the minimum of the total reserved number of the segments, a parameter $\Psi$ is defined as the summation of the reserved number of the segments R for each one of the queues, a parameter $\phi$ is defined as a total number of the segments in the share buffer but having not been used yet, and
   the queue control device determines that the target connection port is in a situation of congestion when the reserved number of the segments R of one of the queues for the target connection port to store the data packet is zero, and the total number of the segments $\phi$ in the share buffer but having not been used is less than or equal to a maximum between the minimum of the total reserved number of the segments D and the summation of the reserved number of the segments R for each one of the queues $\Psi$.

8. A method for a congestion control, the method comprising the steps of:
   (a) determining whether or not a target connection port is under a situation of congestion, the step (a) comprising:
      when a total number of the segments in a share buffer which have not been used is less than a minimum value of a threshold for congestion, then the target connection port is determined as under a situation of congestion, wherein the minimum value of the threshold for congestion uses segments as units and is used to prevent buffer starvation during a worst situation;
   (b) according to a type of service of a data packet, enqueuing the data packet to a high priority queue or a low priority queue corresponding to the target connection port if the target connection port is under the situation of congestion;
   (c) performing backpressure control if a workstation or Local Area Network (LAN) connected to the target connection port is not full duplex;

(d) performing drop control if the workstation or LAN does not carry out a function of flow control; and (e) performing congestion control, according to an input congestion mode of the queue on which the data packet is enqueued if the workstation or LAN does carry out a function of flow control.

9. The method in accordance with claim 8, wherein the input congestion mode represents a flow control or a drop control.

10. The method in accordance with claim 8, wherein the step (a) further comprises:

if the reserved number of the segments of one of the queues for the target connection port to store the data packet is zero, and a situation of congestion has occurred on any one of the other connection ports, then a situation of congestion is determined for the target connection port.

11. The method in accordance with claim 8, wherein a parameter D is defined as the minimum of the total reserved number of the segments, a parameter $\Psi$ is defined as the summation of the reserved number of the segments R for each one of the queues, and a parameter $\phi$ is defined as a total number of the segments in a share buffer but having not been used yet, wherein the step (a) further comprises:

if the reserved number of the segments R of one of the queues for the target connection port to store the data packet is zero, and the total number of the segments $\phi$ in the share buffer but having not been used is less than or equal to a maximum between the minimum of the total reserved number of the segments D and the summation of the reserved number of the segments R for each one of the queues $\Psi$, then a situation of congestion is determined for the target connection port.

12. A network switching apparatus with congestion control, the network switching apparatus comprising:

a share buffer;

a plurality of connection ports;

a buffer control device, coupled to the share buffer;

a plurality of connection port control devices, coupled to the buffer control device, wherein the connection port control devices correspond to the connection ports one by one, when a connection port control device of the connection port control devices receives a data packet from a source of a connection port, said connection port control device makes a request to the buffer control device, according to a size of the data packet, for allocating at least one segment needed by the data packet, and thereby the data packet is stored in the at least one segment;

a forwarding device, coupled to the connection port control devices, and determining a target connection port, for the data packet, according to a type of service of the data packet; and a queue control device, which is coupled to the buffer control device and the forwarding device, wherein the queue control device comprises a plurality of high priority queues and a plurality of low priority queues, one of the high priority queues and one of the low priority queues correspond to one of the connection port control devices, wherein the queue control device associates the at least one segment, to one of the priority queues, according to the type of service of the data packet;

wherein the queue control device is further used for determining whether the target connection port is in a situation of congestion so as to enqueue the data packet, according to the type of service of the data packet, to one of the high priority queue and the low priority queue which corresponds to the target connection port if the target connection port is in a situation of congestion;

wherein the queue control device determines that the target connection port is in a situation of congestion when a total number of the segments which have not been used is less than a minimum value of a threshold for congestion, wherein the minimum value of the threshold for congestion uses segments as units and is used to prevent buffer starvation during a worst situation.

13. A network switching apparatus with congestion control, the network switching apparatus comprising:

a share buffer;

a plurality of connection ports;

a buffer control device, coupled to the share buffer;

a plurality of connection port control devices, coupled to the buffer control device, wherein the connection port control devices correspond to the connection ports one by one, when a connection port control device of the connection port control devices receives a data packet from a source of a connection port, said connection port control device makes a request to the buffer control device, according to a size of the data packet, for allocating at least one segment needed by the data packet, and thereby the data packet is stored in the at least one segment;

a forwarding device, coupled to the connection port control devices, and determining a target connection port, for the data packet, according to a type of service of the data packet; and a queue control device, which is coupled to the buffer control device and the forwarding device, wherein the queue control device comprises a plurality of high priority queues and a plurality of low priority queues, one of the high priority queues and one of the low priority queues corresponding to one of the connection port control devices, and wherein the queue control device associates the at least one segment, to one of the priority queues, according to the type of service of the data packet;

wherein the queue control device is further used for determining whether the target connection port is in a situation of congestion so as to enqueue the data packet, according to the type of service of the data packet, to one of the high priority queue and the low priority queue which corresponds to the target connection port if the target connection port is in a situation of congestion;

wherein the queue control device determines that the target connection port is in a situation of congestion when a reserved number of the segments of one of the queues for the target connection port to store the data packet is zero, and a situation of congestion has occurred on any one of the other connection ports.

14. A network switching apparatus with congestion control, the network switching apparatus comprising:

a share buffer;

a plurality of connection ports;

a buffer control device, coupled to the share buffer;

a plurality of connection port control devices, coupled to the buffer control device, wherein the connection port control devices correspond to the connection ports one by one, when a connection port control device of the connection port control devices receives a data packet from a source of a connection port, said connection port control device makes a request to the buffer control device, according to a size of the data packet, for allocating at least one segment needed by the data packet, and thereby the data packet is stored in the at least one segment;

a forwarding device, coupled to the connection port control devices, and determining a target connection port, for the data packet, according to a type of service of the data packet; and a queue control device, which is coupled to the buffer control device and the forwarding device, wherein the queue control device comprises a plurality of high priority queues and a plurality of low priority queues, one of the high priority queues and one of the low priority queues correspond to one of the connection port control devices, wherein the queue control device associates the at least one segment, to one of the priority queues, according to the type of service of the data packet;

wherein the queue control device is further used for determining whether the target connection port is in a situation of congestion so as to enqueue the data packet, according to the type of service of the data packet, to one of the high priority queue and the low priority queue which correspond to the target connection port if the target connection port is in a situation of congestion;

wherein the queue control device determines that the target connection port is in a situation of congestion when a reserved number of the segments of one of the queues for the target connection port to store the data packet is zero, and a total number of the segments in the share buffer but having not been used is less than or equal to a maximum between the minimum of the total reserved number of the segments and the summation of the reserved number of the segments for each one of the queues.

15. A method for a congestion control, the method comprising:

(a) determining whether or not a target connection port is under a situation of congestion, the step (a) comprising:
if a reserved number of segments of one of a plurality of queues for the target connection port to store a data packet is zero, and a situation of congestion has occurred on any one of other connection ports, then a situation of congestion is determined for the target connection port;

(b) according to a type of service of a data packet, enqueuing the data packet to a high priority queue or a low priority queue corresponding to the target connection port if the target connection port is under the situation of congestion;

(c) performing backpressure control if a workstation or Local Area Network (LAN) connected to the target connection port is not full duplex;

(d) performing drop control if the workstation or LAN does not carry a function of flow control; and (e) performing congestion control, according to an input congestion mode of the queue on which the data packet is enqueued if the workstation or LAN does carry a function of flow control.

16. A method for a congestion control, the method comprising:

(a) determining whether or not a target connection port is under a situation of congestion, the step (a) comprising:
if a reserved number of segments of one of a plurality of queues for the target connection port to store a data packet is zero, and a total number of the segments having not been used is less than or equal to a maximum between the minimum of the total reserved number of the segments and the summation of the reserved number of the segments for each one of the queues, then a situation of congestion is determined for the target connection port;

(b) according to a type of service of a data packet, enqueuing the data packet to a high priority queue or a low priority queue corresponding to the target connection port if the target connection port is under the situation of congestion;

(c) performing backpressure control if a workstation or Local Area Network (LAN) connected to the target connection port is not full duplex;

(d) performing drop control if the workstation or LAN does not carry a function of flow control; and (e) performing congestion control, according to an input congestion mode of the queue on which the data packet is enqueued if the workstation or LAN does carry a function of flow control.

* * * * *